United States Patent [19]

Bermingham et al.

[11] 4,076,106
[45] Feb. 28, 1978

[54] SNAP FASTENERS FOR BRAKE DISK WEAR PLATES

[75] Inventors: Peter D. Bermingham, Mogadore; Robert W. Chin, Akron, both of Ohio

[73] Assignee: Goodyear Aerospace Corporation, Akron, Ohio

[21] Appl. No.: 733,732

[22] Filed: Oct. 19, 1976

[51] Int. Cl.² .............................................. F16D 69/04
[52] U.S. Cl. .............................. 188/250 G; 24/217 R; 24/DIG. 17; 188/73.2; 192/107 R
[58] Field of Search .............. 188/73.1, 73.2, 218 XL, 188/250 B, 250 G; 192/70.13, 107 R; 24/216, 217 R, DIG. 17

[56] References Cited

U.S. PATENT DOCUMENTS

| | | | |
|---|---|---|---|
| 1,789,133 | 1/1931 | Bluhm | 188/250 G |
| 2,116,444 | 5/1938 | Maier | 24/217 |
| 2,440,685 | 5/1948 | Huelster | 24/217 |
| 2,612,139 | 9/1952 | Collins | 24/217 |
| 3,605,967 | 9/1971 | Warren et al. | 188/218 XL |
| 3,685,623 | 8/1972 | Bradshaw | 188/218 XL |
| 3,710,914 | 1/1973 | Lowery et al. | 188/218 XL |
| 3,769,661 | 11/1973 | Bengtsson | 24/DIG. 17 |
| 4,017,945 | 4/1977 | Stanik et al. | 24/217 R |

FOREIGN PATENT DOCUMENTS

| | | | |
|---|---|---|---|
| 48,568 | 2/1911 | Austria | 24/217 R |
| 2,363,427 | 6/1975 | Germany | 192/107 R |

Primary Examiner—Trygve M. Blix
Assistant Examiner—Edward R. Kazenske
Attorney, Agent, or Firm—P. E. Milliken

[57] ABSTRACT

Brake disk wear pad plates have various different types of snap fasteners so that adjacent wear pads may be releasably joined together. Desirably, the brake pad plates are located on opposite sides of a brake disk core and thus are held together by the fasteners usually extending through the core. Generally, the snap fasteners may be of a projection-recess-type fitting in which the projection and recess matingly and releasably engage each other or of a common-component type wherein a structural part matingly and releasably engages both adjacent fasteners. When the brake disk wear pads are worn, the brake disk pad plates are readily disengaged from each other, new wear pads inserted into the brake disk plates and the wear pad plates once again snap fastened to each other.

1 Claim, 10 Drawing Figures

U.S. Patent  Feb. 28, 1978  Sheet 1 of 3  4,076,106
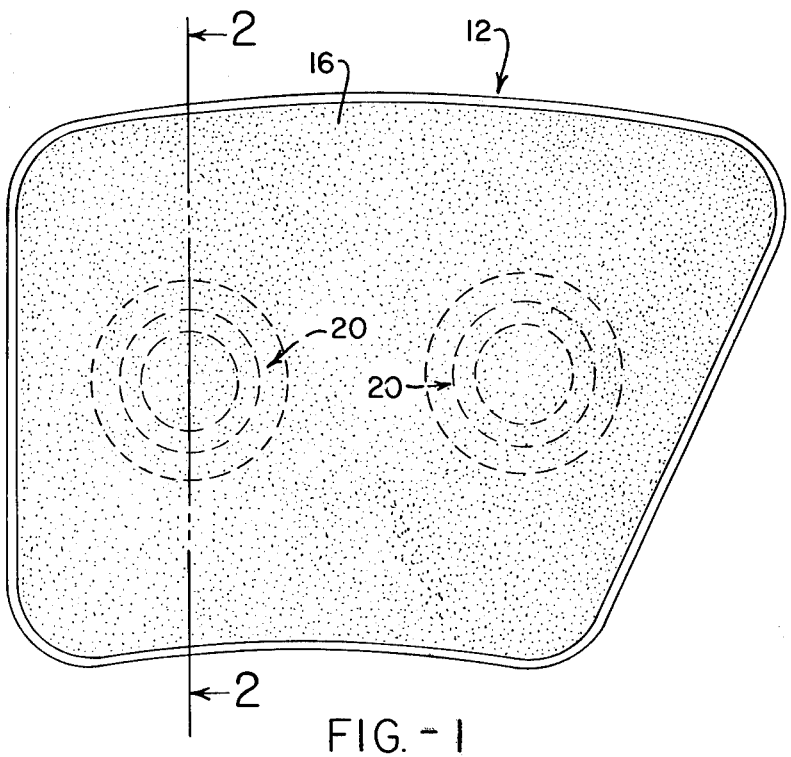
FIG.-1
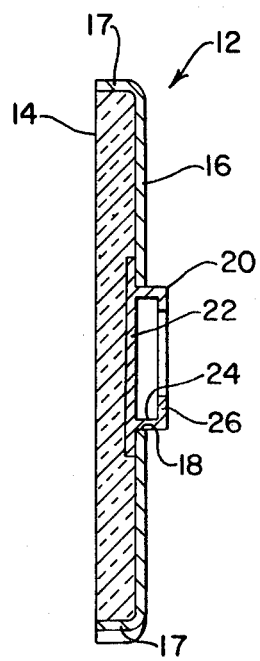
FIG.-2
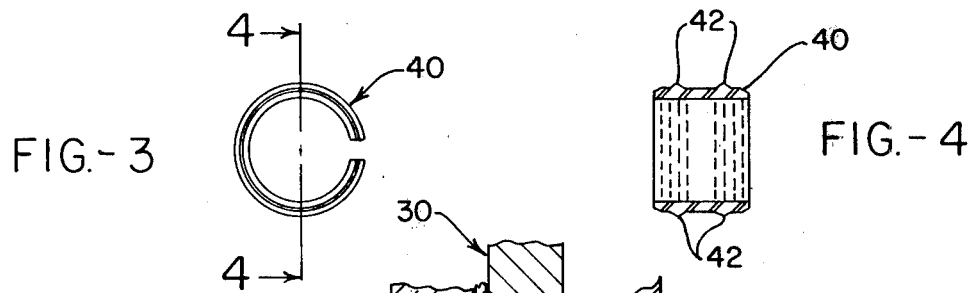
FIG.-3
FIG.-4
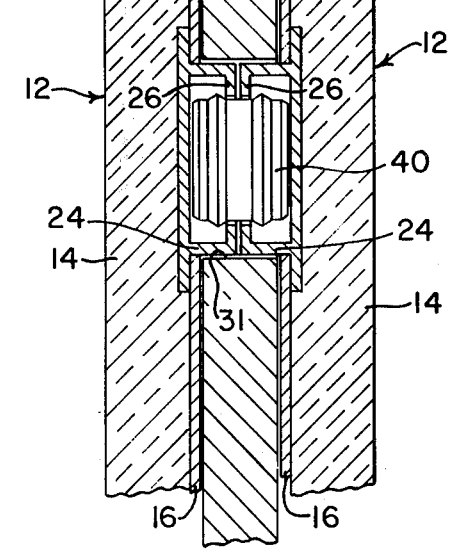
FIG.-5

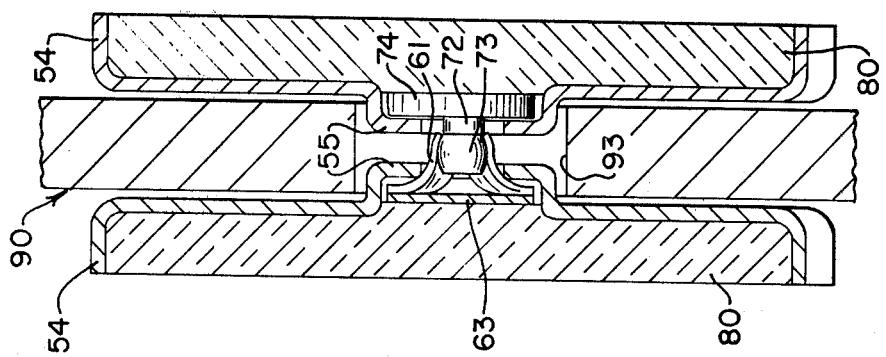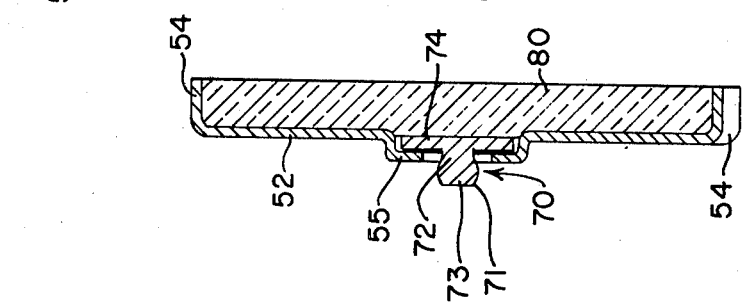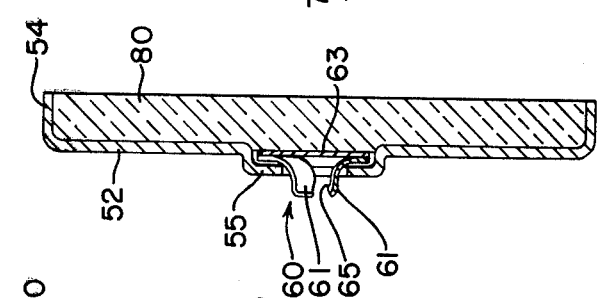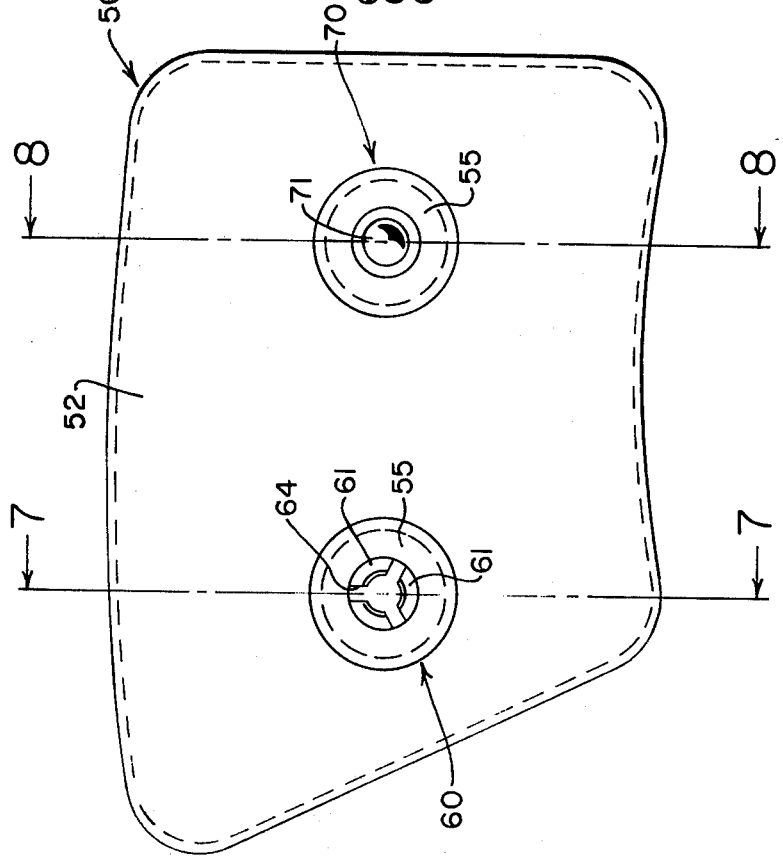

SNAP FASTENERS FOR BRAKE DISK WEAR PLATES

BACKGROUND OF THE INVENTION

The present invention relates to snap fasteners for brake disk wear pad plates. More specifically, the present invention relates to brake disk wear pad plates which are attached to opposite sides of a brake disk core and are releasably secured together through various types of snap fasteners located on the brake disk wear pad plate.

Heretofore, metallic brake wear pads generally have been secured to the opposite sides of a brake disk core through rivets. Although the rivets provided a good connection during operation, extensive time and effort was required to remove the old worn pads and install new pads. The usual replacement method involved drilling a hole through the rivet, punching out any remaining rivet material, inserting the new wear pad in place and riveting the new wear pad to the brake disk core. This procedure was timely and hence costly. Additionally, the rivet itself which is generally large, that is, about ½ inch in diameter, took up wear pad space and thus wasted a portion of the wear pad as well as shortened the life thereof.

A variation of the rivet connection is set forth in U.S. Pat. No. 3,920,108, wherein a rivet having a head mechanically engages a recess in a wear pad lining cup. Another embodiment of the patent relates to a projection on the wear pad lining cup which is welded to a similar projection on an adjacent wear pad lining cup. In either situation, these connections are essentially rivet connections and still require the drilling of a hole through the connection in order to remove the worn wear pads.

SUMMARY OF THE INVENTION

It is therefore an object of the present invention to provide a brake disk wear pad plate having a snap fastener.

It is another object of the present invention to provide a snap fastener on a brake disk wear pad plate, as above, wherein the fastener may contain either a projection or a recess, or both.

It is a further object of the present invention to provide a snap fastener on a brake disk wear pad plate, as above, wherein the projection and recess may be respectfully a tongue and a groove, a ball and a socket, and the like.

It is an additional object of the present invention to provide a snap fastener on a wear pad plate, as above, wherein the fastener on one assembly matingly and releasably engages a fastener on an adjacent wear pad plate.

It is yet another object of the present invention to provide a snap fastener on a wear pad plate, as above, wherein adjacent wear pad plates are held together through a common structural component engaging the fastener of each wear pad plate.

It is yet another object of the present invention to provide a snap fastener on a brake disk wear pad plate, as above, wherein said adjacent wear pad plates are located on the opposite sides of a brake disc core.

It is yet another object of the present invention to provide a snap fastener on a brake disk wear pad plate, as above, wherein the fastener of each adjacent wear pad plate have projections which have a recess and said adjacent wear pad plates are held together by a common retaining ring which resides in the recess of each said fastener.

It is yet another object of the present invention to provide a snap fastener on a brake disk wear pad plate, as above, wherein one fastener on an adjacent pair of wear pad plates contains a ball projection and a fastener and the remaining adjacent wear pad plate contains a projection having a recess therein so that said ball and recess releaseably and matingly engage each other to effect a secure connection of the adjacent wear pad plates.

It is yet another object of the present invention to provide a snap fastener on a brake disk wear pad plate, as above, wherein the wear pad plates may be readily removed and a new wear pad plate installed.

It is yet another object of the present invention to provide a snap fastener on a brake disk wear pad plate, as above, wherein no hole exists in the brake lining of the wear pad plate as would exist when a rivet is utilized to connect the wear pad plate to a core or to another wear pad plate.

It is yet another object of the present invention to provide a snap fastener on a brake disk wear pad plate, as above, wherein the brake pad has a greater wear area and hence a longer life and a larger heat sink.

It is yet another object of the present invention to provide a snap fastener on a brake disk wear pad plate, as above, wherein the fastener may be welded to the wear pad plate.

These and other objects of the present invention will become apparent from the following specification which describes in detail various embodiments without attempting to discuss all of the modifications in which the invention might be embodied; the invention being measured by the appended claims.

In general, a brake disk wear pad fastener comprises a brake disk wear pad plate, said plate having a fastener extending therefrom, and said fastener selected from the group consisting of a projection and a recess. Additionally, a brake disk wear pad comprises a brake disk wear pad plate, said plate having a fastener extending therefrom, another plate having a fastener extending therefrom, said plates being joined together through an intermediate component.

BRIEF DESCRIPTION OF THE DRAWINGS

FIG. 1 is a top plan view of a brake disk wear pad plate having a fastener thereon in accordance with the concepts of the present invention.

FIG. 2 is a sectional view taken on line 2—2 of FIG. 1 showing the fastener and the brake disk wear pad plate.

FIG. 3 is a plan view of a structural component which connects the brake disk wear pad plates together.

FIG. 4 is a cross-sectional view taken on line 4—4 of FIG. 3.

FIG. 5 is a cross-sectional view showing two brake disk wear pad plates connected to a core plate through the fasteners and the structural components.

FIG. 6 is a plan view of another embodiment of a brake disk wear pad plate fastener, according to the concepts of the present invention.

FIG. 7 is a cross-sectional view taken on line 7—7 of FIG. 6 and shows a recess-type fastener.

FIG. 8 is a cross-sectional view taken on line 8—8 of FIG. 6 and shows a projection-type fastener.

FIG. 9 is a cross-sectional view showing the projection and recess-type fasteners connected so that the wear pads are on opposite sides of a brake core.

PREFERRED EMBODIMENTS OF THE INVENTION

Figure 10:
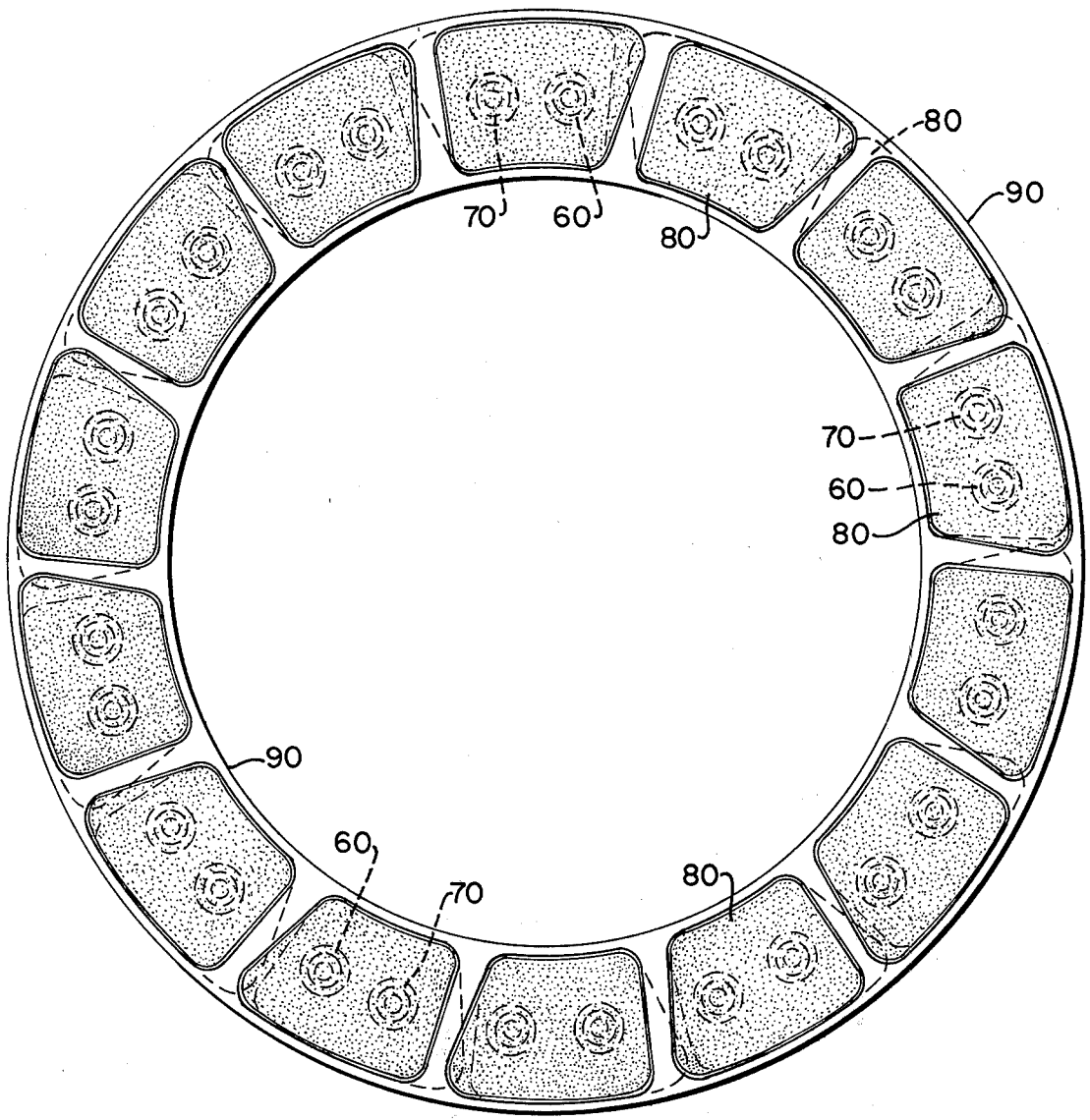
FIG. 10 is a plan view of a brake core having brake disk wear pads mounted thereon using fasteners as shown in FIGS. 6 through 9.

According to the concepts of the present invention, brake disk wear pad plates are releasably connected through a fastener either to a brake core plate or to another brake disk wear pad plate of a brake disk assembly. The fastener connection may be used on any type of apparatus where brake disks of brake stacks are generally utilized. A primary field of use is aircraft, both commercial and military, trucks, and an apparatus wherein industrial brakes are utilized such as overhead cranes, motors and the like. The fastener connection may be employed on either a rotor core plate or a stator core plate and permits the brake disk wear pads to be quickly changed utilizing ordinary tools such as a screwdriver.

The wear pad plates utilized in disk brakes according to the present invention contain at least one snap fastener which permits the wear plates to be attached to either a rotor or stator core plate as in a conventional disk stack. Although the wear plate through the fastener may be attached directly to the core plate, generally the wear plates are mounted on opposite sides of a core plate and are connected together through the fasteners. Desirably, the fasteners releasably and matingly engage each other as over the radially inner and outer circumference of the core or as through an aperture in the core plate. The snap fasteners employed generally consist of two categories; the first being a projection-recess type wherein one wear pad assembly contains a projection with the other mounted wear plate containing a recess; the second type of fastener connection comprises a fastener, usually in the form of a receptacle, which is the same on both wear pad plates and wherein the fasteners are connected by an intermediate or common component engaging each fastener.

Considering the first type of fastener, exemplary types include such matingly engageable connections such as a ball and socket, a tongue and groove, a pin and a grasp, and the like. Exemplary of the second type are engageable projections secured together by a pin, cup-like projections engaged by a retaining ring and the like. Desirably, regardless of the specific type of fastener utilized, they are designed so that they may be readily released upon the application of a small amount of force so that old wear pads can be quickly removed and new wear pads snapped into place. Of course, an individual wear pad plate may contain a plurality of a projection-type fastener with an adjacent wear pad plate mounted on a common core plate containing an equal number of matingly engageable recess-type fasteners. Moreover, a particular wear pad plate may contain any number of both a projection and a recess-type fastener with an adjacent pad containing any number of a matingly engageable recess and projection type fasteners.

Referring to FIG. 2, a brake disk wear pad plate generally indicated by the numeral 12 is shown having a snap fastener, generally indicated by the numeral 20 thereon. Wear pad plate 12 contains a top portion 16 and a side wall 17. Top portion 16 desirably contains an aperture 18 for the fastener. Wear pad 14 may be attached to wear pad plate 12 in any conventional manner such as through the use of an adhesive. In the embodiment shown in FIG. 2, the wear pad is attached simply by crimping or bending sides 17 of the brake disk plate 12 about the wear pad so that sides 17 are inwardly angled. Generally, any type of metal or other material may be utilized as the brake disk wear plate so long as it can withstand the high temperature encountered in a braking operation. A suitable material is a high temperature steel such as Type 1040 or Type 1050. The wear pad material may also be any conventional material well known to those skilled in the art such as a copper-brass alloy which will withstand temperatures up to approximately 2,000° C. In order to prevent banging of one wear plate against a segmented core plate or another wear plate during a braking operation, the wear plate may have a tapered leading or trailing edge as shown in FIG. 1.

As seen in FIG. 2, fastener 20 is generally a projection type of fastener mounted on wear plate 12 and is connected to another similar or identical fastener through an intermediate component shown in FIGS. 3 and 4. Fastener 20, as shown in FIG. 2, has a base portion or bottom portion 22, preferably which resides on the inside of wear pad 12. Extending from bottom portion 22 is an annular flange or side wall 24. An inwardly extending lip 26 is located on the outermost portion of annular flange 24. Thus, annular flange 24 in association with lip 26 forms a recess.

Although fastener 20 may be held in place by wear pad 14, it may be desirable to use some conventional form of attachment. In the specific embodiment shown, the annulus of bottom portion 22 which resides beneath the wear pad plate is electrically (resistant) welded to the wear plate. Additionally, annular flange 24 may be precisely shaped so that it seats within aperture 18 of the wear plate and is also electrically welded between abutting surfaces. As with the wear plate, fastener 20 may be made out of any type of material capable of withstanding high braking temperatures. Steels constitute a preferred type of material, a desirable material being Type 1010 or Type 1020 steel. In addition to having a high melting point, these types of steels, as well as Type 1040 and Type 1050, have good machining properties.

Referring now to FIG. 5, a wear plate having a snap fastener as described immediately above may be attached to one side of a brake disk core plate, generally indicated by the numeral 30, with an identical wear plate and fastener attached to the other side of the core plate. Although the wear plate through fastener 20 may be directly attached to the core plate, it is generally desirable to attach the two opposite wear plates to each other through the fasteners and an intermediate component which is shown in FIGS. 3 and 4.

The preferred intermediate or common component is generally indicated by the numeral 40 and it is a snap retaining ring. The retaining ring, as shown in FIG. 3, is generally circular but has a small portion thereof cut away so as to allow the ring to be inwardly compressed so that it may fit into one of the fasteners and snap or resiliently slide into place. In order to facilitate the engagement and disengagement of the ring, the outer circumference thereof has two ridges 42 as shown in FIG. 4. The ridges may be arcual or simply tapered as shown. In any event, they have a small incline to allow the ridge to slide over lip 26 of fastener 20 as the retaining ring is compressed. When the retaining ring once passes under lip 26, the ring will then snap into the recess formed by annular flange 24 and lip 26 of the fastener and thus effect a secure and mechanical engagement. Thus, two wear plates attached to opposite sides of core plate 30 may be readily and securely engaged to each other through fasteners 20 and the intermediate component snap retaining ring 40 as shown in FIG. 5. Although the two fasteners may be mounted at the radially inner and outer ends of the wear plates so that they bridge the core plate, conveniently, they extend through aperture 31 which may be by drilling. Since the two wear plates are securely connected to each other by the matingly engagement of the snap retaining ring, they can be separated by prying a wear plate away from the core plate as through the use of a lever, for example, a screwdriver, which will apply a force to the snap ring and cause it to compress and thereby disengage it from the fastener recess.

Another preferred snap fastener of the present invention is shown in FIGS. 6 through 10 and generally is indicated by the numeral 60 and 70. The brake disk wear pad plate, generally indicated by the numeral 50, may be identical to wear plate 12 as described above. That is, wear plate 50 has a top portion 52 with side walls 54 extending therefrom. Walls 54 engage wear pad 80 as through crimping and securely maintain the wear pad in place. The wear pad may be made out of any suitable and conventional brake lining material which can withstand the high temperatures encountered and may be a copper-brass alloy. Similarly, wear plate 50 may be made out of any material capable of withstanding the high temperatures encountered and desirably may be made from steel such as Type 1040 or Type 1050.

As best seen in FIGS. 7 and 8, top portion 52 of the wear plate has a protuberance or a button 55 which may be made by simply pressing out a portion of the wear plate. The space or recess created by the button provides for the insertion of a fastener.

In this particular embodiment, the fasteners are releasable and matingly engageable. Considering fastener 60 shown in FIG. 7, it consists of a plurality of prongs 61 which extend outwardly from button 55. The prongs are attached to a base plate 63 in any conventional manner and may be integral therewith. Prongs 61 generally have an annular configuration as shown in FIG. 6 and are separated from one another through slots 64. Additionally, the prongs generally contain a lateral extension or side recess 65.

Referring to FIG. 8, fastener 70 contains a button 55 which contains a projection 71 generally composed of a shaft 72 and a ball or knob 73 located at the outwardly end portion of the shaft. The outside diameter of ball 73 is generally a bit larger than the diameter of the prong end 61 and desirably is equal to approximately that of the side recess 65 of the prongs. Projection 71 is maintained within button 55 through a base plate 74 which may reside between wear pad 80 and the button. Fastener 70 may also be made out of any suitable material capable of withstanding high temperatures such as Type 1040 or Type 1050 steel.

As in the embodiment shown in FIGS. 6 through 10, fasteners 60 and 70 may be secured to wear plate 50 through electric welding. Thus, base plate 63 of the prongs of fastener 60 as well as base plate 74 of the projection of fasteners 70 will become welded to the wear plate and particularly to button portion 55 of the wear plate.

As shown in FIG. 9, the wear plates may be connected together but on opposite sides of a core plate, generally indicated by the numeral 90, wherein the fasteners reside within the core plate aperture 91. Since prongs 61 are serrated or have slots 63, ball 73 of projection 71 may be snapped into side recess 64 of the prongs. Thus, a secure but releasable engagement is effected.

Upon substantial wear of wear pads 80, brake disk wear pad plates 50 may be separated through the use of a simple lever and a new set of wear plates containing brake linings or pads installed. Since the base portion of the fastener does not project any substantial distance into the brake lining, the lining or pad covers the entire area of the brake disk wear plate 50. The same is true with regard to wear pads 14. Thus, an increased amount of brake lining area is available than in various prior art embodiments which generally utilize a rivet. That is, in order to install a rivet in the various prior art embodiments, a portion of the brake lining was removed. Thus, the present invention permits longer brake life, gives better braking due to the larger pad or lining area and has a larger heat sink to dissipate heat buildup. Additionally, as noted, only a small amount of force is required to separate any matingly engaged brake disk wear pad plates.

Although various particular embodiments have been described in detail, the invention is not to be limited thereto in that the fasteners may be secured to the brake disk wear plates in any conventional manner, in that a plurality of fasteners exists on an individual wear plate, in that the fasteners may not extend through an aperture in the core plate but bridge the radial inner and outer circumferences of the core plate and the like as well understood to those skilled in the art. Thus, while the preferred embodiments have been described in detail in accordance with the patent statutes, it is to be understood that the scope of the invention is limited by the scope of the attached claims.

What is claimed is:

1. Releasably connected brake disk wear plates, comprising:
  a first brake disk wear plate, said first plate having a top portion and a wear pad therein,
  said top portion of said first wear plate having a button formed therein,
  a projection fastener having a base plate positioned in said button,
  a shaft attached to said base plate and having an enlarged ball shaped end with said shaft and ball shaped end extending through an aperture in said button,
  a core plate having an aperture therein, said first wear plate engaging said core plate on one side thereof with said button and projection fastener extending into said core aperture,
  a second brake disk wear plate, said second plate having a top portion and a wear pad therein,
  said top portion of said second wear plate having a button formed therein,
  a resilient female prong fastener, said prong fastener including a base plate positioned in said button of said second wear plate and a number of sections attached to said prong fastener base plate with the end portions of said sections extending through an aperture in said button of said second wear plate,
  said second wear plate engaging the opposite side of said core plate than said first wear plate with said second wear plate button and said prong fastener extending into said core aperture, said sections of said prong fastener releasably and matingly engaging said ball shaped end of said projection fastener and said end portions are free to move radially of said ball shaped end to engage and disengage the same so that said first and said second wear plates are releasably engaged to said core plate, said buttons having adjacent opposed surfaces spaced from each other, said end portions of said sections and said ball shaped end having engaging surfaces positioned in the area between the opposed faces of said buttons.

* * * * *